United States Patent
Feng

[19]

[11] Patent Number: 5,860,333
[45] Date of Patent: Jan. 19, 1999

[54] INDEX DRIVE

[76] Inventor: Geng-Jin Feng, 16 Cedarwoods Crescent, Apt. 602, Kitchener, Ontario, Canada, N2C 2L4

[21] Appl. No.: 885,177

[22] Filed: Jun. 30, 1997

[51] Int. Cl.$^6$ .............................. B23Q 16/06; F16H 7/00
[52] U.S. Cl. ..................... 74/813 R; 74/816; 74/813 L; 74/136
[58] Field of Search .................. 74/136, 137, 813 R, 74/816, 817, 822, 825, 827, 813 C, 813 L; 474/148

[56] References Cited

U.S. PATENT DOCUMENTS

| | | | |
|---|---|---|---|
| 642,637 | 2/1900 | Small | 74/136 |
| 2,251,856 | 8/1941 | Radich | 74/136 |
| 4,354,402 | 10/1982 | Scott | 74/822 |

*Primary Examiner*—Charles A. Marmor
*Assistant Examiner*—Mary Ann Battista
*Attorney, Agent, or Firm*—R. Craig Armstrong

[57] ABSTRACT

In the indexing mechanism, for producing rotary indexing of a primary sprocket or pulley, a locking bracket is operable to alternately lock or unlock the primary sprocket or pulley. At the same time, the locking bracket alternately unlocks or locks an endless chain or synchronous belt at a locking location. The chain or synchronous belt passes around the primary sprocket or pulley and past the chain or synchronous belt locking location. The chain or synchronous belt has first and second loops between the primary sprocket or pulley and the chain or synchronous belt locking location, on opposite sides thereof. First and second secondary sprockets or pulleys are mounted on the ends of first and second cylinder rods respectively, each secondary sprocket having one of the loops passing over it. The locking bracket is moved between two positions, to lock either the sprocket or pulley, or the chain or synchronous belt at the locking location. The first and second cylinders are counter-actuated to increase the length of chain or synchronous belt in one loop while decreasing the length of chain or synchronous belt in the other loop by the same amount, so as to pull the chain or synchronous belt to rotate the primary sprocket or pulley while the chain or synchronous belt is locked at its locking location, and so as to return to a starting position when the sprocket or pulley is locked.

6 Claims, 9 Drawing Sheets

FIG.10

INDEX DRIVE

BACKGROUND OF THE INVENTION

This invention relates to mechanical equipment generally, and particularly to index drives.

Index drives of the type in this invention are intended to produce step-by-step ("indexed") rotary motion of a sprocket or ribbed pulley or the like, via an endless chain or synchronous belt respectively. The sprocket or pulley may be connected in any desired conventional fashion to produce whatever indexed motion is actually required.

In the manufacturing of index drives, as in that of other mechanical equipment, the general situation is, the better the performance, the higher the cost.

Despite numerous past solutions, there remains a need for an improved index drives which is simple, robust, effective, and inexpensive. Existing index drives tend to be too expensive, too ineffective, or both.

SUMMARY OF THE INVENTION

It is an object of the invention to provide an improved indexing mechanism.

In the invention, effective indexing is carried out by a simple sequence of steps, using inexpensive, readily-available components. An optimum balance point between performance and cost has thus been found.

The mechanism for producing rotary indexing of a primary sprocket or pulley has sprocket or pulley locking means, operable to alternately lock or unlock the primary sprocket or pulley, and an endless chain or synchronous belt passing around the primary sprocket or pulley and past chain or synchronous belt locking means. The chain or synchronous belt locking means is operable to alternately lock or unlock the chain or synchronous belt at a locking location. The chain or synchronous belt has first and second loops between the primary sprocket or pulley and the chain or synchronous belt locking location, on opposite sides thereof. First and second secondary sprockets or pulleys are mounted on the ends of the rods of first and second cylinders respectively, each secondary sprocket having one of the loops passing over it. Control means are provided for alternately locking and unlocking the sprocket or pulley and at the same time unlocking and locking the chain or synchronous belt at its locking location, and for counter-actuating the first and second cylinders to increase the length of chain or synchronous belt in one loop while decreasing the length of chain or synchronous belt in the other loop by the same amount, so as to pull the chain or synchronous belt to rotate the primary sprocket or pulley while the chain or synchronous belt is locked at its locking location, and so as to return to a starting position when the sprocket or pulley is locked.

In the preferred embodiment, a single locking bracket is used as the sprocket or pulley locking means and the chain or synchronous belt locking means. The locking bracket is operable via a third cylinder between two locking positions, namely one in which only the sprocket or pulley is locked, and one in which only the chain or synchronous belt is locked at its locking location.

The control means, from a starting position in which the locking bracket is in the chain or synchronous belt locking position, the first cylinder is extended, and the second cylinder is retracted, operates the mechanism in the following steps:

a. with the chain or synchronous belt still locked, retracting the first cylinder, whereby the chain or synchronous belt rotates the sprocket or pulley;

b. actuating the third cylinder to move the locking bracket to the sprocket or pulley locking position;

c. retracting the second cylinder to return the first and second cylinders to their starting positions;

d. actuating the third cylinder to move the locking bracket back to the chain or synchronous belt locking position; and e. repeating steps a. to d. as desired, to produce indexed movement of the sprocket or pulley.

Apart from solving the cost problem, this invention also greatly improves interchangeability between different models, indexing stability, the size of the center through hole, etc.. The invention is especially suitable for the manufacturing of index drives in a wide range of light, medium and heavy duty designs.

In the preferred embodiment of the invention, an endless chain and sprocket are used, although a synchronous belt and pulley could instead be used, by direct analogy. For convenience, the following description will refer to the chain and sprocket version only, but it should be clearly understood that this is not intended to limit the invention in any way to just chain and sprocket configurations.

It is much cheaper to buy the chain, sprocket and other components used in the invention than to produce custom-made precision components like cams and flanges in a typical cam mechanism as commonly used in the prior art. The sprocket and chain perform well in either high or low load transmission. In most applications, the sprocket can serve directly as an indexing component, rather than being connected to other means, thus reducing the cost further. One limitation of the invention, however, is that it cannot be used for applications involving weight lifting.

BRIEF DESCRIPTION OF THE DRAWINGS

In order that the invention may be more clearly understood, the preferred embodiment will be described in detail below, with reference to the accompanying drawings thereof, in which.

DETAILED DESCRIPTION OF THE PREFERRED EMBODIMENT

Referring to the drawings, the basic configuration of the preferred embodiment of the invention is as follows.

A large primary sprocket 25 is fixed on a hollow shaft 34 which is co-axial with a fixed shaft 30, which has a center through hole 31. The center through hole 31 can serve different applications with a wide range of diameters.

The large primary sprocket 26 is the target for indexing, i.e. it is the component which is rotated in step-wise or "indexed" fashion. The sprocket can be used to directly drive something requiring indexing in some applications, or can be connected in any conventional fashion to any other means requiring indexed motion. The end use for the indexed motion of the sprocket is not relevant to the invention; the invention relates simply to the production of the indexed motion of the sprocket, and what that sprocket is then connected to is immaterial.

An endless chain 24 passes around the large sprocket 25 and all of the other sprockets as illustrated and as will be described, i.e. from sprocket 25, around sprockets 10 and 8, along a guide block 20, around sprockets 7 and 9, and back to sprocket 25.

On a locking bracket 23, which is movable towards and away from the sprocket 25, there are a few locking teeth which can be engaged with the chain 24 to lock the chain against movement at that location. On the same locking bracket are locking pins 22 which can be engaged with the tooth gaps of the sprocket 25, to lock it against rotation. The locking bracket is actuated via the piston rod 6 of double-acting cylinder 3, which moves block 19 which in turn moves the locking bracket 23 via a direct connection through the guide rods 21. While the locking teeth on bracket 23 are engaged in the chain 24, the chain 24 is locked at that location, and at the same time the sprocket 25 is unlocked. On the other hand, when the cylinder 3 has its piston rod 6 extended, so that locking pins 22 are engaged in the sprocket 25, the sprocket is locked in position, and at the same time the chain is unlocked at its locking location. Thus, at the locking bracket location, either one or the other of the chain and the sprocket is locked, but not both.

The indexed motion of the sprocket is achieved by alternating between locking of the chain and the sprocket, while operating cylinders 1 and 2 to move the 5 sprockets 10 and 9 back and forth in the manner explained in more detail below. Cylinders 1 and 2 preferably work on their head chambers only (i.e. the chamber with the piston rod). The bore of cylinder 1 is typically larger than that of cylinder 2, as shown in the drawings, although they could be of equal size if desired. Cylinder 2 is constantly connected to a source of compressed air (or hydraulic fluid, in cases where the invention is hydraulically operated instead of pneumatically operated).

The small secondary sprocket 10 is fixed on shaft 28, which is connected with bearings on a fork 12. The fork 12 connects the piston rod 4 of cylinder 1 through a threaded rod 15, locked by lock nuts 13 and 14. They move together with the piston rod 4.

Similarly, the small secondary sprocket 9 is fixed on shaft 29 which is connected with bearings on a fork 11. The fork 11 connects piston rod 5 of cylinder 2 through a threaded rod 18, locked by lock nuts 16 and 17. They move together with piston rod 5.

The sprocket 8 is fixed on shaft 27, which like the guide block 20 is bearing-mounted in a fixed position. Similarly, the sprocket 7 is fixed on shaft 26, which is also in a fixed position. These fixed-position sprockets (or pulleys where synchronous belts are used) are positioned wherever required to change the direction of the chain. In other embodiments, i.e. where the configuration is different from the configuration as illustrated, these fixed-position sprockets are located wherever necessary to ensure the correct routing of the chain or synchronous belt.

Control means, such as preferably a computer or programmable logic controller (PLC), not illustrated, are provided to implement the following operating sequence:

Operating Sequence

1. Starting position

Figure 1:
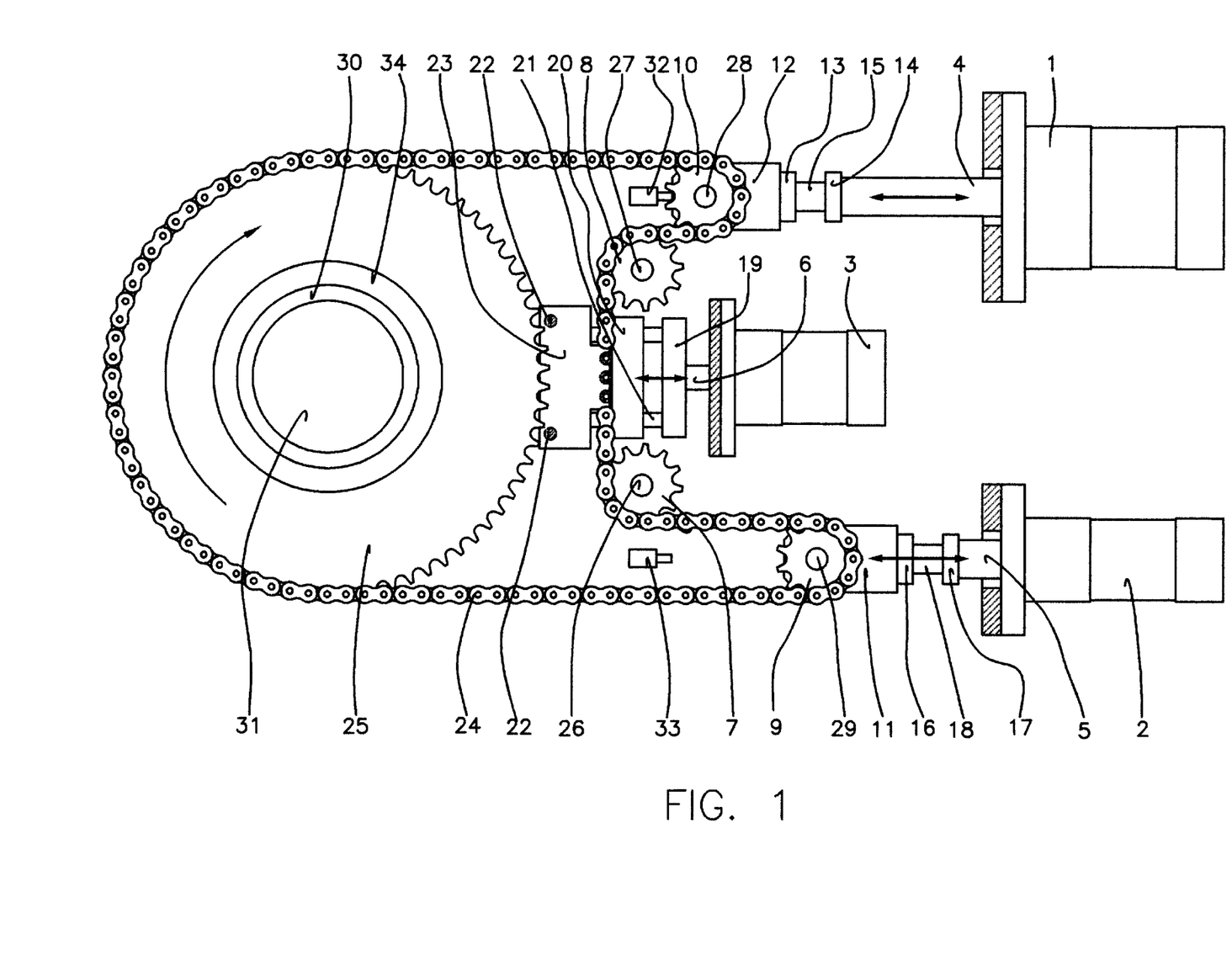
FIG. 1 is a schematic view of the preferred embodiment in a first or "starting" position of the indexing sequence.
Figure 1A:
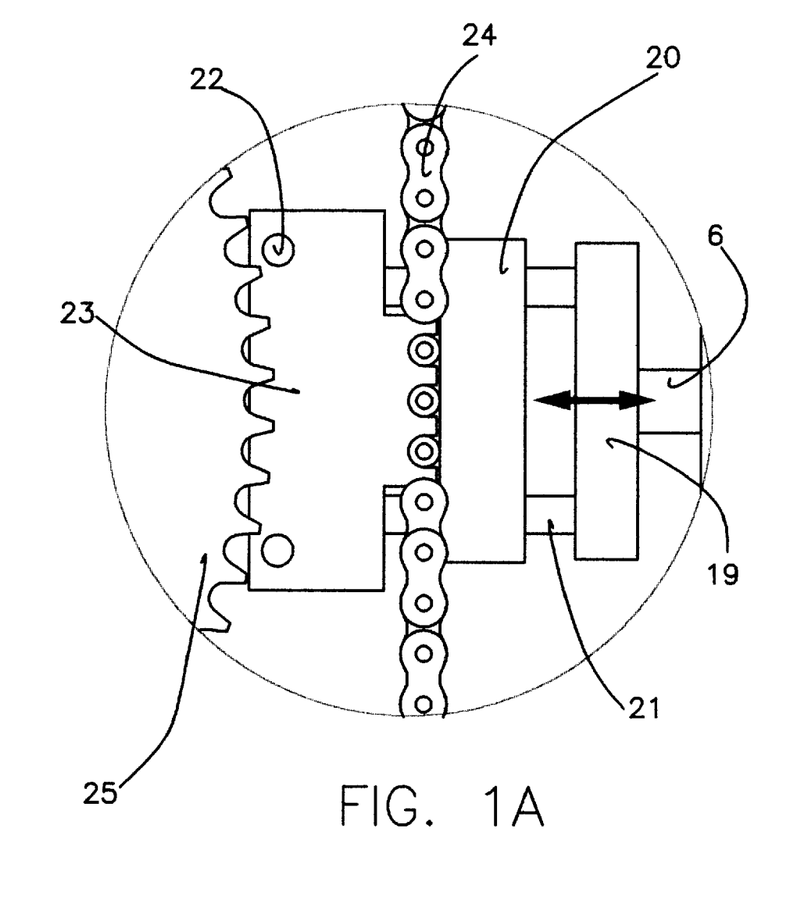
FIG. 1A is an enlarged view of the locking bracket area in FIG. 1.
Figure 2:
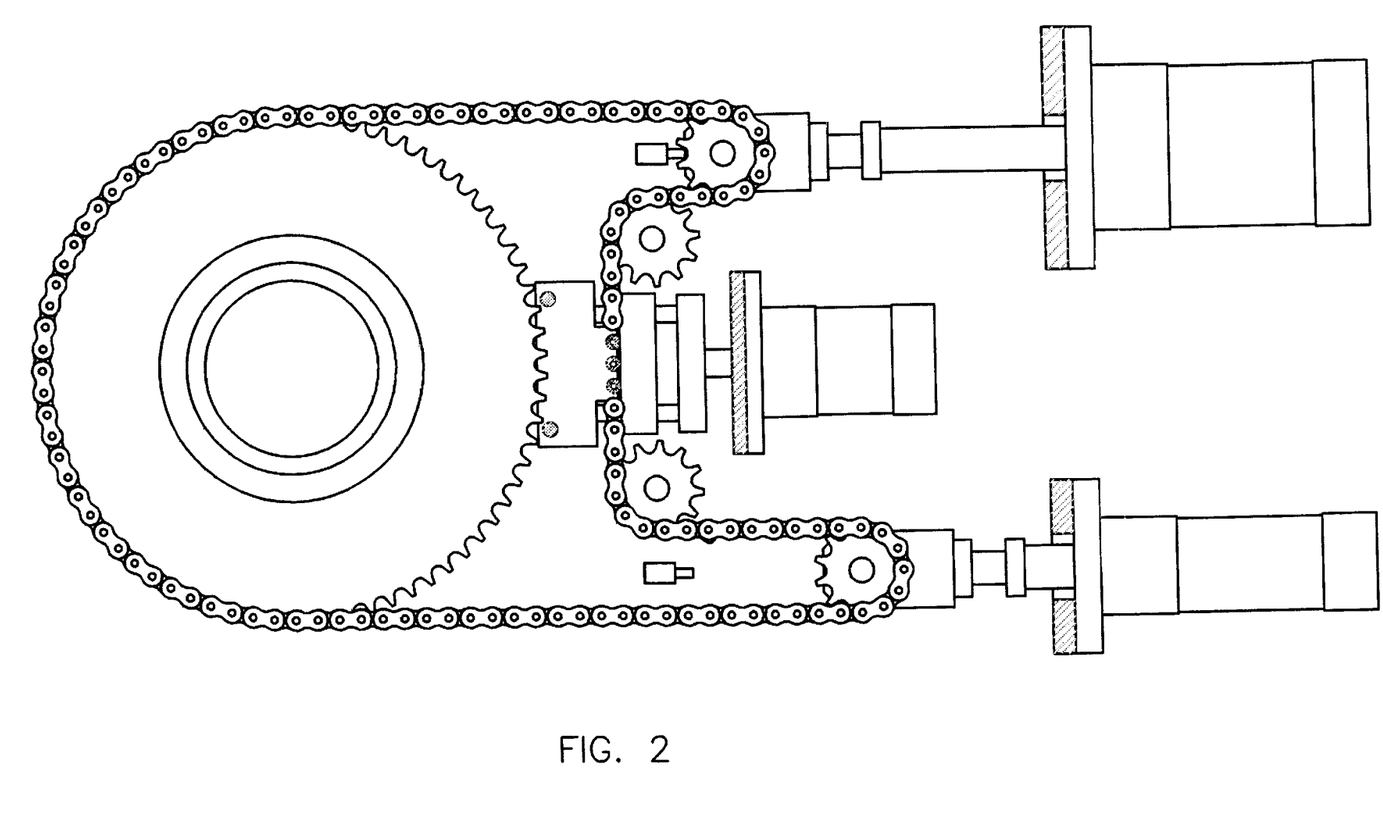
FIG. 2 is a more detailed view of the starting position.

As shown in FIGS. 1 and 2, piston rod 6 of cylinder 3 is at the right end of its stroke, making the locking teeth on bracket 23 lock the chain 24 at that location, the locking pins 22 therefore being retracted from the sprocket 25. The head chamber of cylinder 3 (i.e. the chamber with the piston rod) is now filled with compressed air and the cap chamber of cylinder 3 (i.e. the chamber without the piston rod) is exhausted.

The chamber of cylinder 2 is filled with compressed air constantly. Cylinder 1 is now exhausted. Under the action of cylinder 2, piston rod 5 with its connected parts is now at the right end of its stroke and piston rod 4 with its connected parts is at the left end of its stroke.

2. Working process and functions

Figure 3:
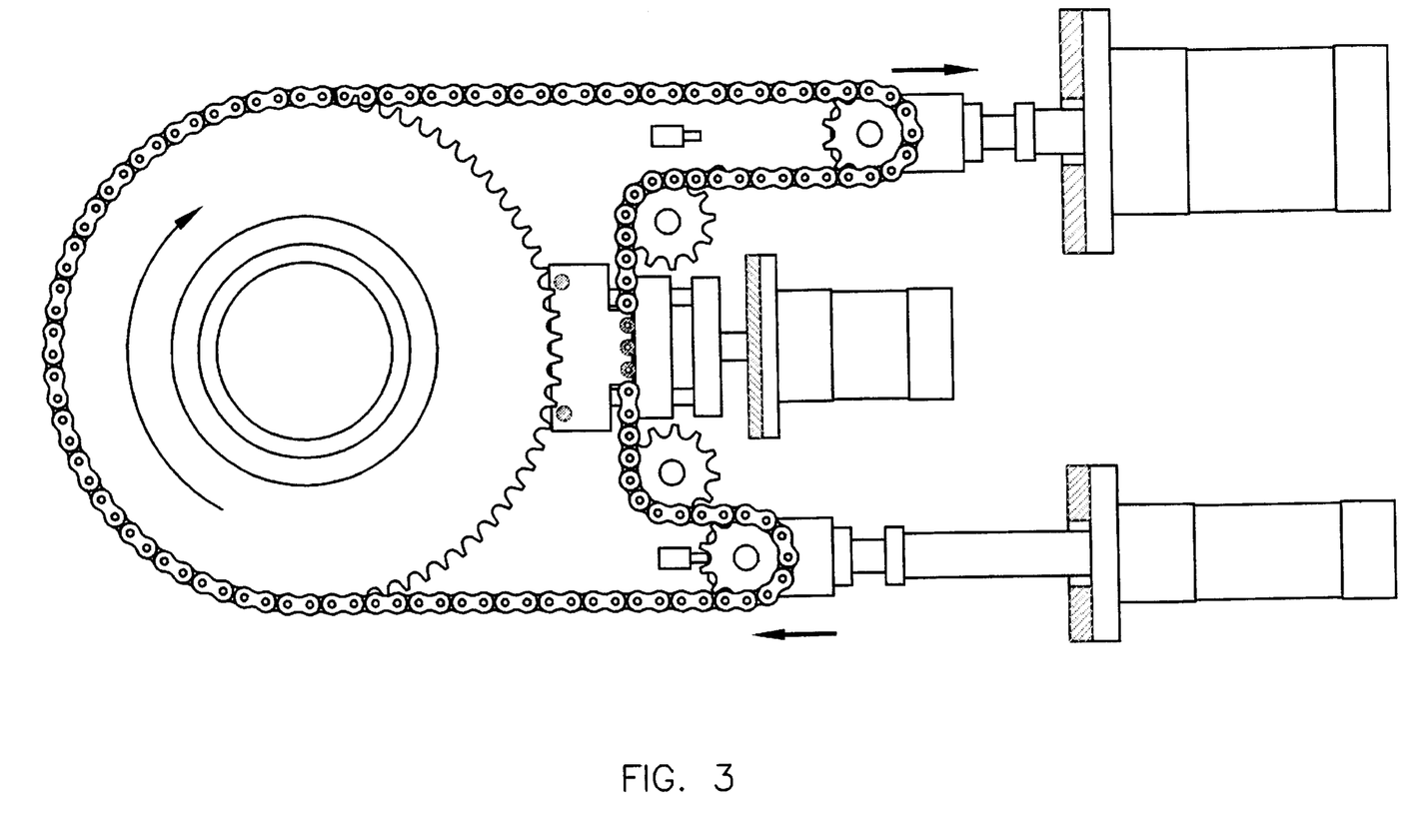
FIG. 3 is a corresponding view of the first step in one cycle of the indexing sequence after the starting position.

A. Input compressed air into the head chamber of cylinder 1:

As shown in FIG. 3, piston rod 4 and its connected parts move towards the right, making the sprocket 25 turn clockwise as shown in the drawing as power is transmitted from cylinder 1 to sprocket 25.

Simultaneously, piston rod 5 of cylinder 2 and its connected parts move towards the left under the action of cylinder 1. When the piston of cylinder 2 comes to the end of its cushioning stroke (or fork 11 is stopped by shock absorber 33 in case it is employed), the equal strokes of cylinders 1 and 2 are ended, and sprocket 25 stops turning. Different degrees of rotation can be achieved by selecting different length strokes of cylinders 1 and 2. Threaded rods 15 and 18 can be used for stroke adjusting and finding the starting point of sprocket 25.

Figure 4:
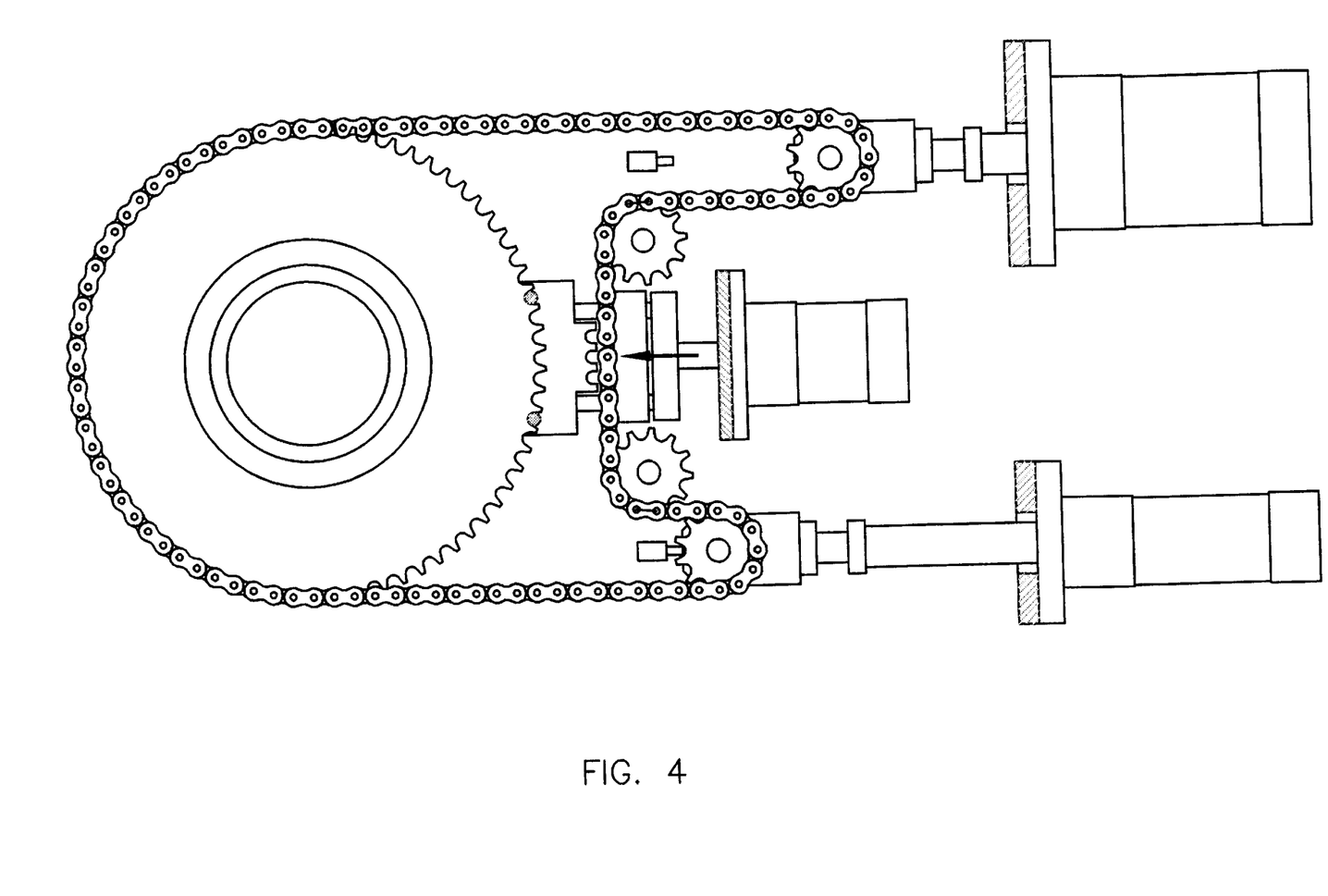
FIG. 4 is a corresponding view of the second step in one cycle of the sequence.

B. Input compressed air into the cap chamber of cylinder 3 with the head side exhausted:

As shown in FIG. 4, piston rod 6 of cylinder 3 moves towards the left, thus moving block 19, guide rods 21, and locking bracket 23. This moves the locking pins 22 towards the sprocket 25, and the locking teeth away from the chain 24. When the locking pins 22 touch the tooth gaps of the sprocket 25, the sprocket is finally positioned and locked in place accurately. At the same time, the chain 24 is unlocked. Cylinder 3 holds the locking as soon as its cap chamber is energized.

The index motion of the chain and power transmission have now been achieved, and it remains to reset the positions so that these steps can be repeated.

Figure 5:
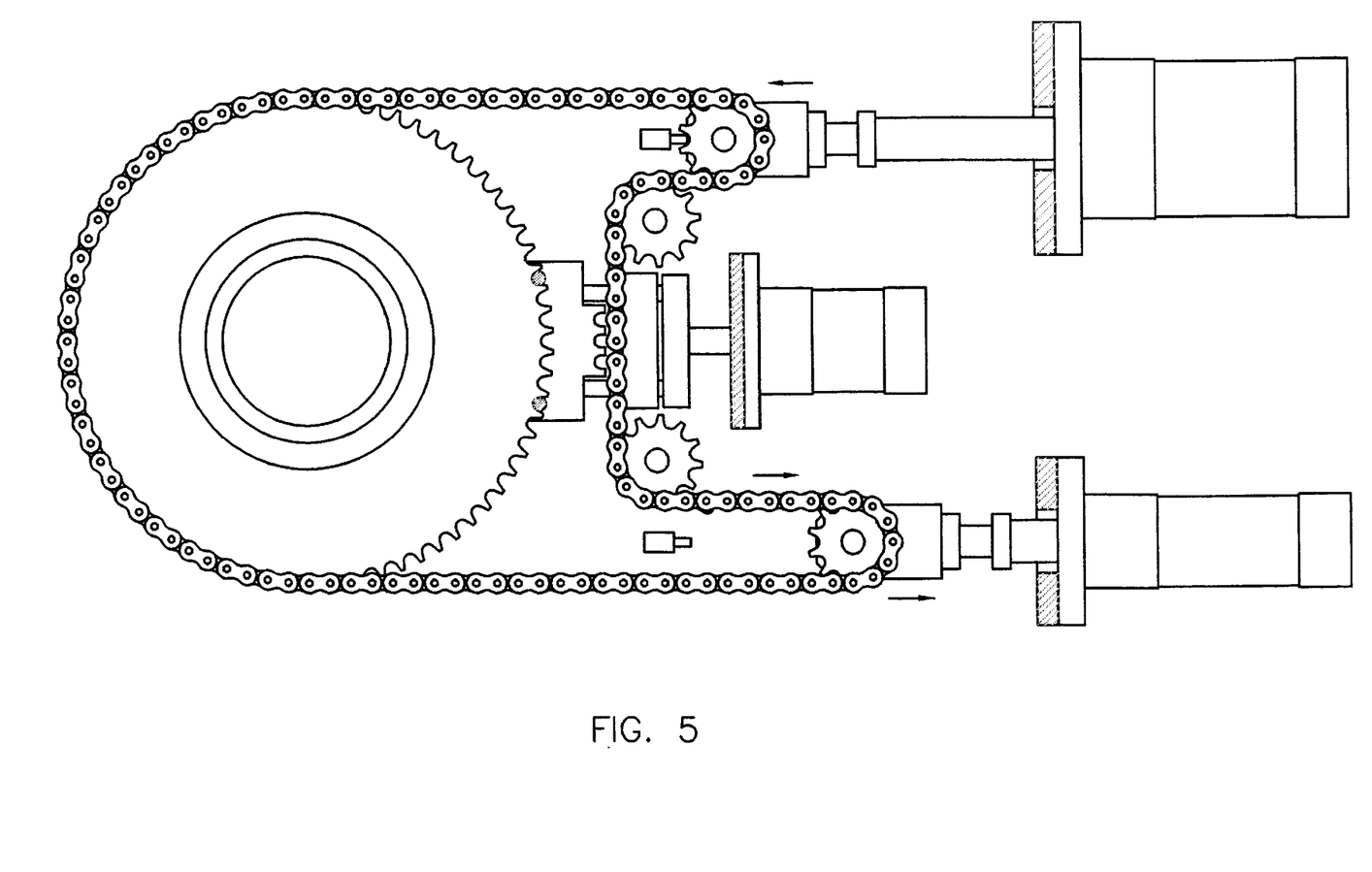
FIG. 5 is a corresponding view of the third step in one cycle of the sequence, the next step being a return to the starting position.

C. Exhaust head chamber of cylinder 1:

As shown in FIG. 5, both cylinders 2 and 1 reverse their stroke under the action of cylinder 2. Because sprocket 25 is still locked by the locking pins 22, piston rod 5 pulls from the other side of the chain locking section the same length of chain as was used to advance the sprocket 25. The strokes of both cylinders 1 and 2 are ended when the piston of cylinder 1 comes to the end of its cushioning stroke (or fork 12 is stopped by shock absorber 32 in case it is employed).

Figure 6:
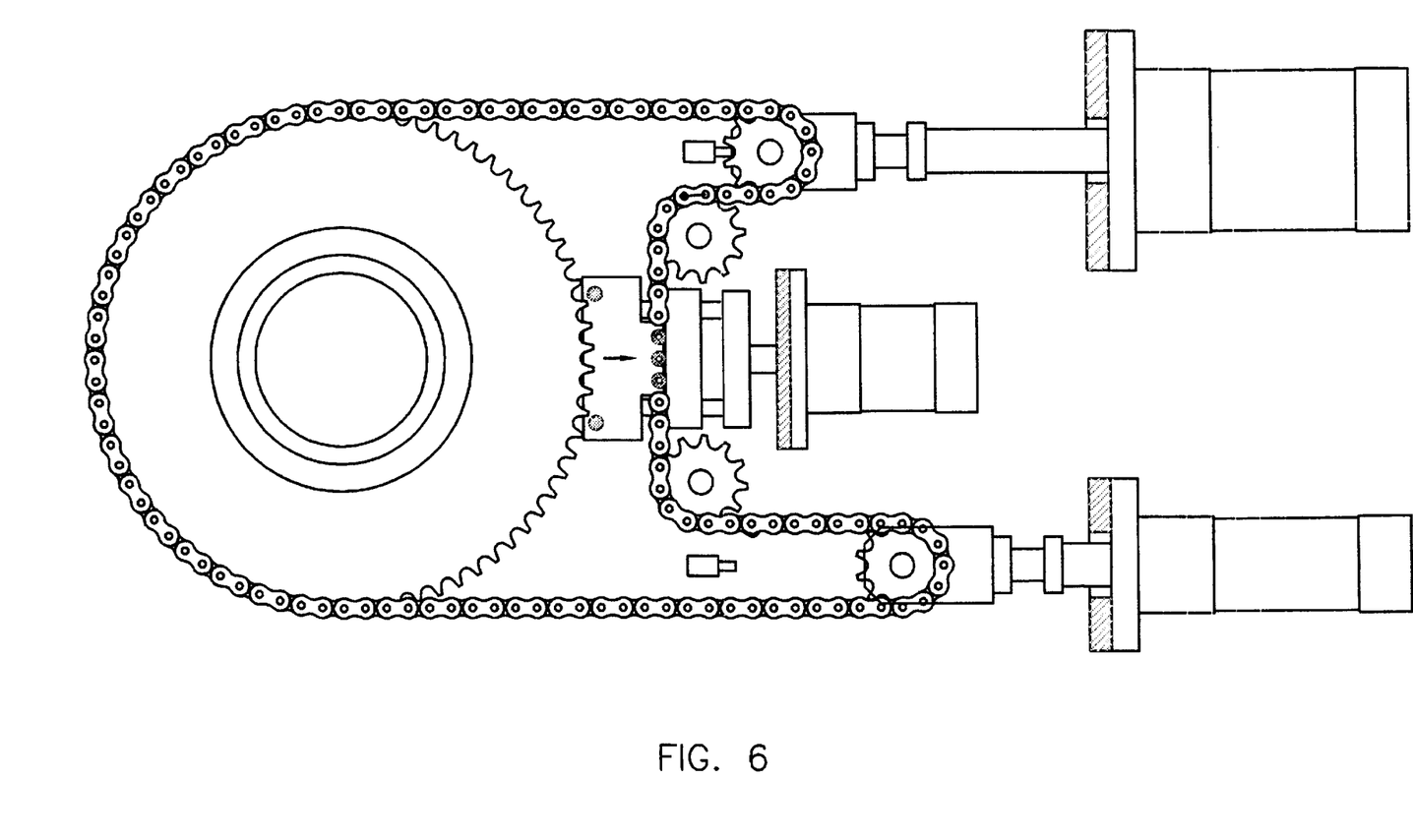
FIG. 6 is a corresponding view of the final step in one cycle of the sequence, being a return to the starting position.
Figure 7:
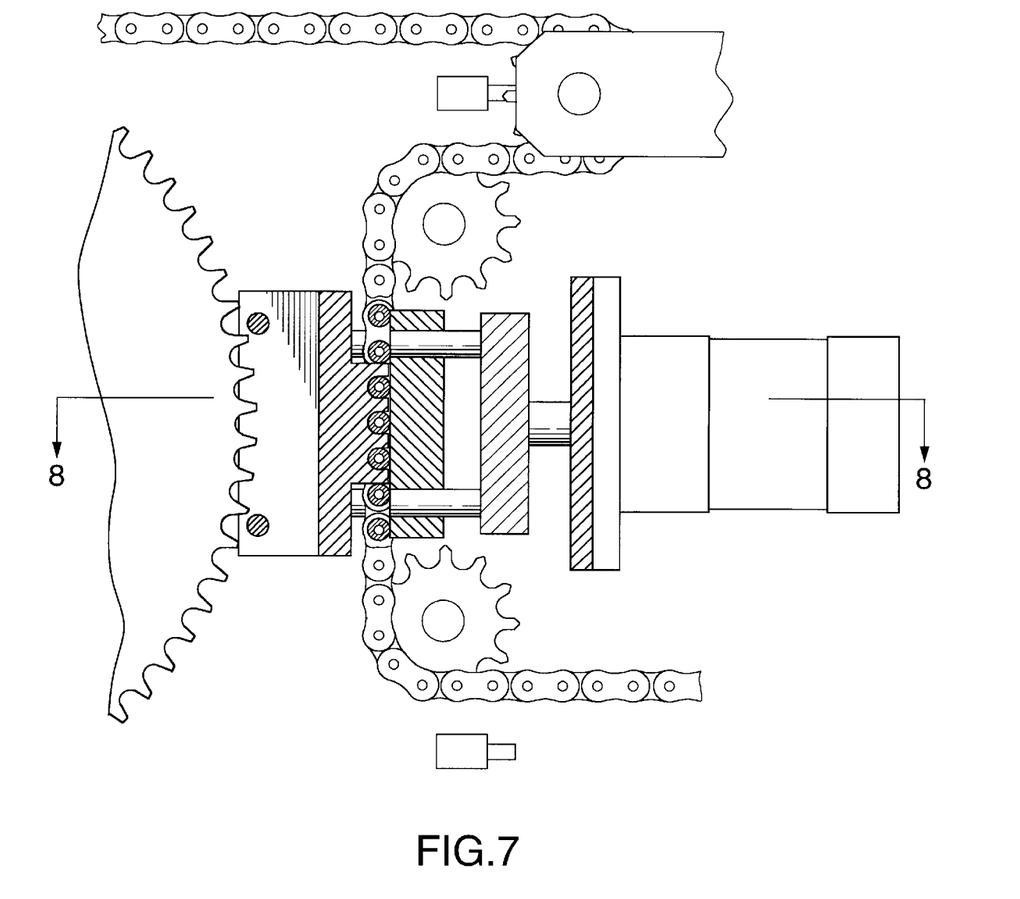
FIG. 7 is a close-up view of the locking bracket area showing the chain locked and the sprocket unlocked.
Figure 8:
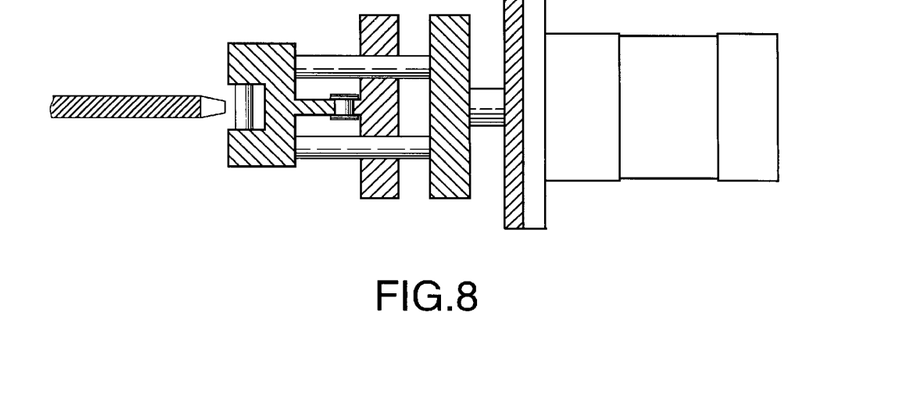
FIG. 8 is a cross-section at 8—8 of FIG. 7.
Figure 9:
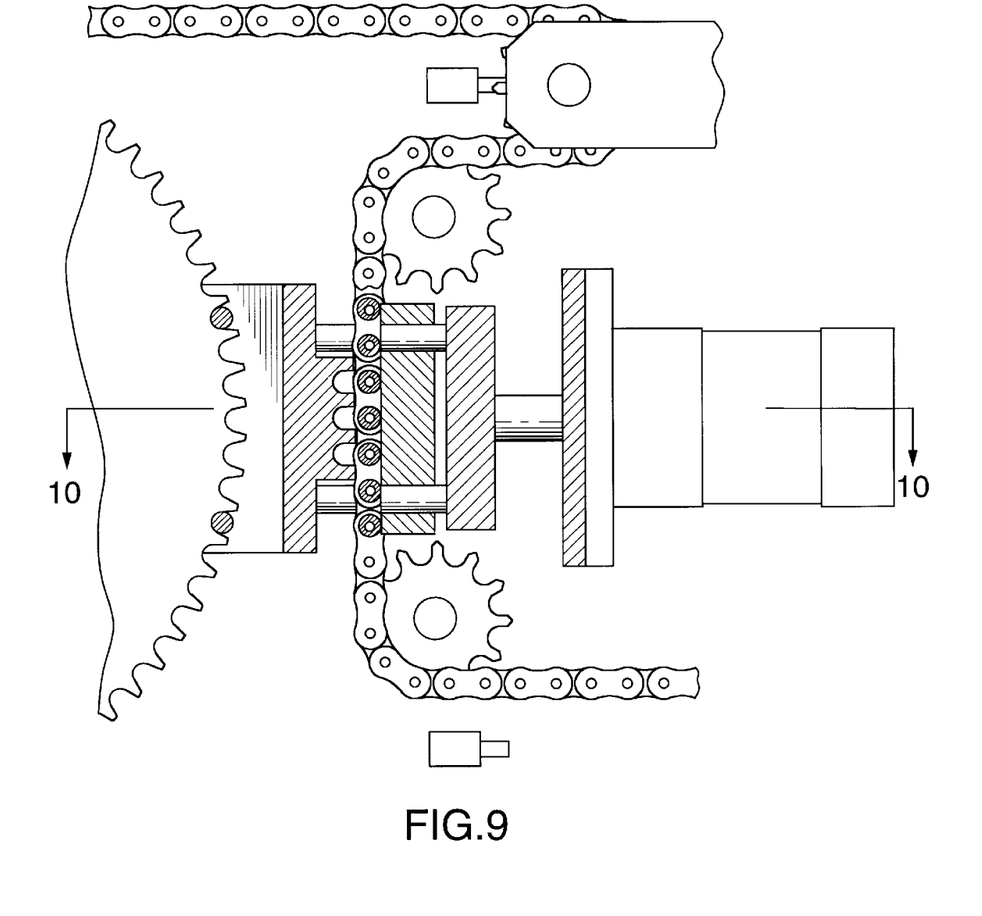
FIG. 9 is a close-up view of the locking bracket area similar to FIG. 7, but showing the chain unlocked and the sprocket locked.
Figure 10:
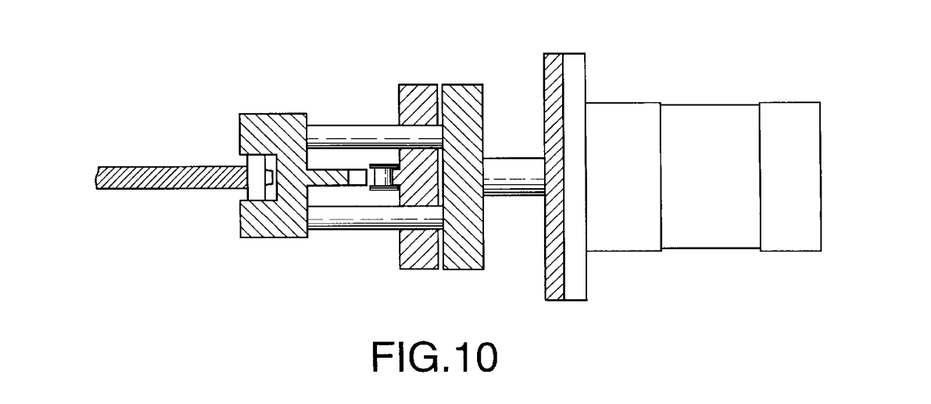
FIG. 10 is a cross-section at 10—10 of FIG. 9.

D. Reverse the stroke of cylinder 3:

As shown in FIG. 6, the chain 24 is again locked at its locking location by the locking teeth on bracket 23, and the sprocket 25 is unlocked at the same time. Cylinder 3 holds the locking as soon as its head chamber is energized. This completes the cycle, i.e. everything is returned to the starting position. The sequence can be repeated endlessly to continuously index the sprocket.

Several further points should be noted in relation to the invention. First of all, it should be noted that by changing the places of cylinders 1 and 2 with each other, the indexing direction can be reversed.

Secondly, it should be noted that different numbers of stops per revolution can be obtained simply by changing the strokes of cylinders 1 and 2 and the length of the endless chain, i.e. the degree of indexing can be varied, as mentioned above.

Thirdly, by using a pneumatic-high pressure hydraulic tandem cylinder in place of cylinder 2, an emergency stop function can be obtained through a simple hydraulic circuit.

Fourthly, by keeping the chain 24 locked at its locking location and moving piston rod 4 of cylinder 1 back and forth, an oscillating function can be obtained if desired.

Advantages of the Invention

The invention offers a number of advantages, some of which have already been mentioned. These advantages include:

1. Low cost with excellent performance.
2. A wide range of capacities—torque can range from 0.5 in-lb. up to possibly 1 million in-lb.
3. A large center through-hole, with less limitation on available space.
4. Constant torque due to constant cylinder force and constant sprocket radius.
5. Better interchangeability. In different models with the same torque but a different number of stops per revolution, the only thing to change is the stroke of the cylinders and the length of the endless chain. In the case of a small stroke difference, the same cylinders can even be used.
6. Changeable turning direction, by switching the driving cylinder with the other one.
7. Oscillating function, simply by readjusting the control sequences.
8. Control of holding torque. Different holding torque can be obtained by selecting different cylinder bores when it is needed, as in some applications.
9. Emergency stop. There is a positive solution for it when it is needed, as in some applications.

Variations

It should be appreciated that the above description relates to the preferred embodiment by way of example only. Many variations may be possible without departing from the scope of the invention, including the following:

1. Different cylinder layouts with the same working principle as described above.
2. Pneumatic or hydraulic cylinders.
3. Another part can be fixed on the same shaft with sprocket 25 to perform positioning and locking, if necessary or desirable. That is, if sprocket 25 is viewed as the indexing output means, there could be a different sprocket or other type of positioning disc, co-axial with sprocket 25, on which the locking bar acts. That sprocket or other form of positioning disc would not necessarily have the same pitch of teeth or other positioning elements as the sprocket 25. It could be much finer, for example, to provide more precise final positioning.
4. Unlike the different sizes shown in the drawings, the bores of cylinders 1 and 2 could be equal.
5. The shaft 34 could be a solid output shaft.
6. Instead of a single locking bracket 23 to carry out the locking of the sprocket or pulley and the chain or synchronous belt, separate brackets or other locking means could be used for each, with suitable controls.
7. Layouts other than as illustrated clearly could be employed. As one example, the cylinders could be positioned at ninety degrees to their illustrated positions, with minimal adaptation.

The most significant possible variation is that the invention clearly could be readily adapted to be used with a synchronous belt instead of a chain. Instead of locking teeth, locking bars would be on the locking bracket 23. A ribbed pulley would take the place of a sprocket, and locking bars would be used instead of locking pins. Clearly, the principles are directly transferable to such an embodiment, with only minimal and purely routine adaptation. The claims which follow therefore contemplate not only the use of a chain, but alternatively the use of a synchronous belt.

I claim:

1. A mechanism for producing rotary indexing of a primary sprocket or pulley, comprising:

sprocket or pulley locking means, operable to alternately lock or unlock said primary sprocket or pulley;

an endless chain or synchronous belt passing around said primary sprocket or pulley and past chain or synchronous belt locking means at a chain or synchronous belt locking location, said chain or synchronous belt locking means being operable to alternately lock or unlock said chain or synchronous belt at said locking location, said chain or synchronous belt having first and second loops between said primary sprocket or pulley and said chain or synchronous belt locking location, on opposite sides thereof;

first and second secondary sprockets or pulleys mounted on the ends of first and second cylinder rods of first and second cylinders respectively, each said secondary sprocket having one of said loops passing over it;

control means for alternately locking and unlocking said sprocket or pulley and at the same time unlocking and locking said chain or synchronous belt at said locking location, and for counter-actuating said first and second cylinders to increase the length of chain or synchronous belt in one said loop while decreasing the length of chain or synchronous belt in the other loop by the same amount, so as to pull said chain or synchronous belt to rotate said primary sprocket or pulley while said chain or synchronous belt is locked at said locking location, and so as to return to a starting position when said sprocket or pulley is locked.

2. A mechanism as recited in claim 1, where said sprocket or pulley locking means and said chain or synchronous belt locking means comprise a single locking bracket, operable via a third cylinder between two locking positions, namely one in which only said sprocket or pulley is locked, and one in which only said chain or synchronous belt is locked.

3. A mechanism as recited in claim 2, where said control means, from a starting position in which said locking bracket is in said chain or synchronous belt locking position, said first cylinder is extended, and said second cylinder is retracted, operates the mechanism in the following steps:

a. with said chain or synchronous belt still locked, retracting said first cylinder, whereby said chain or synchronous belt rotates said sprocket or pulley;

b. actuating said third cylinder to move said locking bracket to said sprocket or pulley locking position;

c. retracting said second cylinder to return said first and second cylinders to their starting positions;

d. actuating said third cylinder to move said locking bracket back to said chain or synchronous belt locking position; and     e. repeating steps a. to d. as desired, to produce indexed movement of the sprocket or pulley.

4. A mechanism as recited in claim 1, where said cylinders are pneumatic.

5. A mechanism as recited in claim 1, where said cylinders are hydraulic.

6. A mechanism as recited in claim 1, where a separate positioning element is positioned co-axially with said primary sprocket or pulley, and where said sprocket or pulley locking means acts on said separate positioning element instead of on said sprocket or pulley directly.

* * * * *